No. 616,577. Patented Dec. 27, 1898.
J. A. LOFSTEDT.
PHOTOGRAPHIC PRINTING FRAME.
(Application filed Apr. 18, 1898.)

(No Model.)

Witnesses:
Samuel W. Balch
H. H. Whitman

Inventor,
Julius A. Lofstedt,
by Thomas Ewing, Jr.,
Attorney.

UNITED STATES PATENT OFFICE.

JULIUS AUG. LOFSTEDT, OF YONKERS, NEW YORK.

PHOTOGRAPHIC-PRINTING FRAME.

SPECIFICATION forming part of Letters Patent No. 616,577, dated December 27, 1898.

Application filed April 18, 1898. Serial No. 677,969. (No model.)

*To all whom it may concern:*

Be it known that I, JULIUS AUG. LOFSTEDT, a citizen of the United States of America, and a resident of Yonkers, county of Westchester, and State of New York, have invented certain new and useful Improvements in Photographic-Printing Frames, of which the following is a specification.

This invention relates particularly to frames for printing from photographic films; but it has also features which are applicable in frames for printing from glass negatives or for use for various other purposes.

The improvement which is of especial value in printing from films consists in margin-clamps by which the edges of the film can be securely held in place while the frame is being closed.

The improvement which is of more general use in printing-frames consists in the form of catches for fastening in the back of the frame to the frame.

Figure 1:
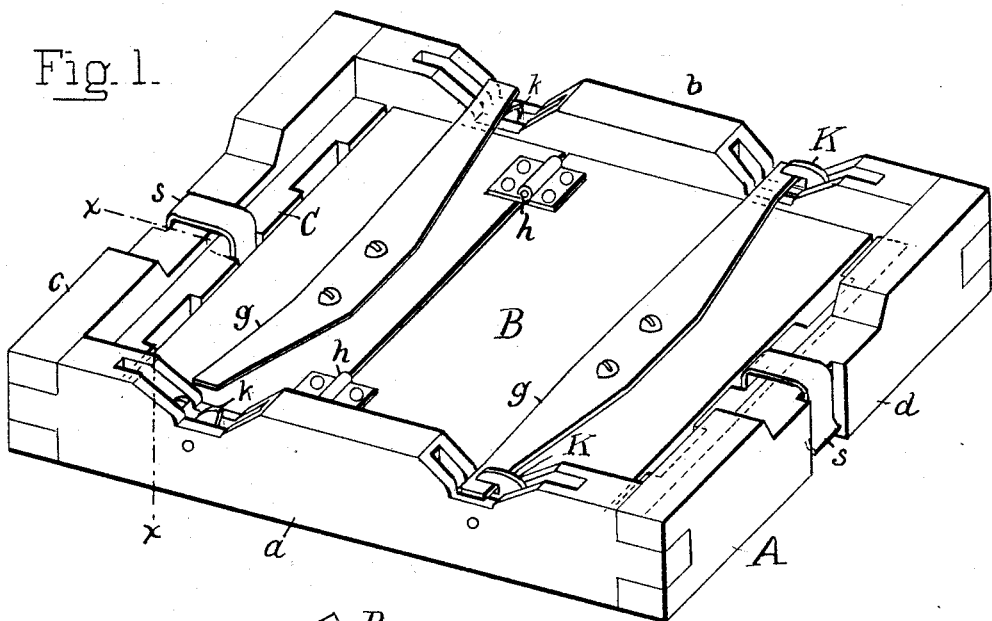
Figure 2:
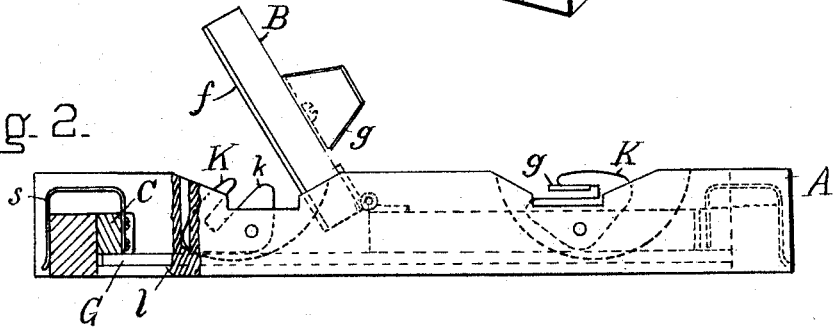
Figure 3:
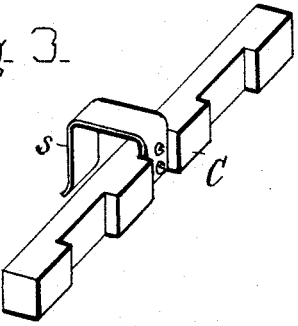
Figure 4:
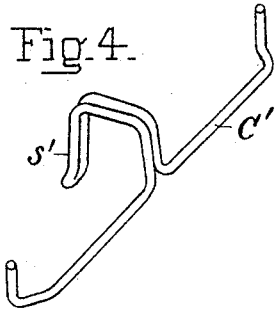

In the accompanying sheet of drawings, which forms a part of this specification, Figure 1 is a perspective view from the back of a photographic-printing frame embodying these improvements. Fig. 2 is a side view of the printing-frame in which one corner is broken away on the line $x\ x$ of Fig. 1. Fig. 3 is a perspective view of one of the margin-clamps. Fig. 4 is a perspective view of a modified form of margin-clamp.

The frame A is conveniently made of four frame-strips of wood, $a\ b\ c\ d$, which are mortised together at their ends. Ledges $l$ project inwardly from the two side strips $a\ b$ to hold the glass G. There are no inwardly-projecting ledges on the end strips $c\ d$, and thus a wider opening for printing is obtained. The film negative is laid on the glass in the frame. Since the edges of the film often have a tendency to curl, means have been provided to catch the edges and hold them down before closing the frame. This is effected by margin-clamps C C, each of which is adjustably held to the adjoining frame-strip by the friction of a bent spring $s$. The margin-clamps can therefore be set with any desired space between them and the glass, so that the margins of the film can be caught under them and the film adjusted in place. The inner face of each of the margin-clamps is notched, thus giving it an open structure, so that the operator can see if there is a sufficient margin caught under the edge of the clamp. The film having been adjusted and the sensitive paper laid on, the frame is closed by the back B. This back consists of two boards, which are hinged together at $h$. The boards have felt linings $f\ f$. Attached to the back of each board is a flat spring $g$, the ends of which are caught under catches K K. The catches are loosely pivoted in slots in the sides $a\ b$ and are so weighted that when not engaging the springs their hooked ends will fall by gravity out of engaging position when the printing-frame is laid face downward. The catches are provided with cams $k$ on the opposite sides of the pivots from the hooked ends, so that when the springs are pressed down against the cams the hooked ends will be lifted into engaging position, and if the springs are suddenly released there will not be time for the catches to fall back by gravity. The catches are so confined that they can move only sufficiently to latch or unlatch the springs. At the two ends of the frame they face in opposite directions, and the catches at each end are so balanced that if the frame is brought toward a vertical position the catches at the end which is held uppermost will fall by gravity into engaging position.

What I claim as my invention, and desire to secure by Letters Patent of the United States, is—

1. In a photographic-printing frame, the combination with the glass and frame-strips, of margin-clamps, each of which is held to the adjoining frame-strip by friction, so as to be adjustable to and from the glass, and a suitable back to the frame, substantially as described.

2. In a photographic-printing frame, the combination with the glass and frame-strips, of margin-clamps having an open structure, and a suitable back to the frame, substantially as described.

3. In a frame, the combination with the frame-strips of gravity-catches with hooked ends pivoted thereto, the hooked end of each catch projecting away from the end of the frame near which the catch is located, and the catches being heaviest on the side of the pivot from which the hook projects, so that the catches at either end will fall by gravity into engaging position when that end is lifted toward a vertical position, and will fall by gravity out of engaging position when the frame is laid face downward, and a suitable back for the frame, which is engaged by the catches, substantially as described.

4. In a frame, the combination with the frame-strips, of catches with hooked ends pivoted thereto, the catches having cams on the opposite sides of their pivots from the hooked ends, and a suitable back for the frame, which is engaged by the catches, substantially as described.

Signed by me, at Yonkers, New York, this 16th day of April, 1898.

JULIUS AUG. LOFSTEDT.

Witnesses:
SAMUEL W. BALCH,
LUCIEN W. JOHNSON.